Figure 1A:
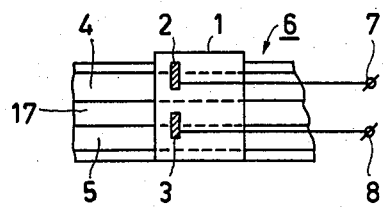

United States Patent [19]

Rijckaert et al.

[11] Patent Number: 4,498,111
[45] Date of Patent: Feb. 5, 1985

[54] METHOD AND APPARATUS FOR RECORDING OR REPRODUCING STEREOPHONIC INFORMATION IN A MAGNETIC RECORD CARRIER

[75] Inventors: Albert M. A. Rijckaert; Anthonie Walraven, both of Eindhoven, Netherlands

[73] Assignee: U.S. Philips Corporation, New York, N.Y.

[21] Appl. No.: 401,043

[22] Filed: Jul. 22, 1982

[30] Foreign Application Priority Data

Aug. 17, 1981 [NL] Netherlands ............... 8103834

[51] Int. Cl.$^3$ ............... G11B 5/43; G11B 5/02
[52] U.S. Cl. ............... 360/27; 360/67
[58] Field of Search ............... 360/27, 28, 77, 67

[56] References Cited

U.S. PATENT DOCUMENTS 3,041,415 6/1962 Gratian ............... 360/27
3,593,333 7/1971 Oswald ............... 360/77

Primary Examiner—Vincent P. Canney
Attorney, Agent, or Firm—Robert T. Mayer; Algy Tamoshunas

[57] ABSTRACT

In accordance with a method of recording and/or reproducing stereophonic information in two adjacent tracks of a magnetic record carrier, an auxiliary signal whose frequency content is situated outside the frequency spectrum of the stereophonic information is recorded in the tracks and in the magnetic record-carrier area between the tracks during recording. During reproduction, the auxiliary signals read from the record carrier by the two transducers is used to control the gain of a pair of variable amplifiers so as to ensure that the amplitudes of the stereophonic information signals thus reproduced are independent of tracking errors.

12 Claims, 5 Drawing Figures

METHOD AND APPARATUS FOR RECORDING OR REPRODUCING STEREOPHONIC INFORMATION IN A MAGNETIC RECORD CARRIER

Method of recording or reproducing stereophonic information in a magnetic record carrier, apparatus for carrying out the method, magnetic record carrier and amplifier circuit to be used in conjunction with an apparatus for carrying out the method.

The invention relates to a method of recording or reproducing information, specifically stereophonic information, in two parallel tracks of a magnetic record carrier by means of electromagnetic transducers, at least one for each of the two tracks. The invention also relates to an apparatus for recording and to an apparatus for reproducing information in two parallel tracks of a magnetic record carrier. Furthermore, the invention relates to a magnetic record carrier and to an amplifier circuit to be used in conjunction with an apparatus in accordance with the invention.

A method of the type mentioned in the opening paragraph is known from "Magnettontechnik" by E. Christian, pages 214 to 221, Franzis-Verlag, Munich, see in particular FIGS. 113 and 114b.

If information, which for the sake of convenience is assumed to be stereophonic information although the invention is not limited thereto, is recorded on a magnetic record carrier in accordance with the known method and is also read in accordance with the known method with an apparatus other than the one which was used to record the information, there may be substantial distortion in the signal being reproduced.

The object of the invention is to eliminate the cause of this substantial distortion. To this end, the method in accordance with the invention is characterized in that during recording, an auxiliary signal is recorded in the tracks and in the magnetic record-carrier area between the tracks. The auxiliary signal has a frequency content situated in a frequency range outside that of the information. During reproduction, the signals, which are read from each of the two tracks by the two transducers, are applied to a filter device which separates the auxiliary signals from the information in both readout signals. This yields a first and a second signal corresponding to the information being read, and a third and a fourth signal corresponding to the auxiliary signal read from the record carrier by each of the two transducers. The amplitudes of the first and the second signal are then both multiplied by a factor corresponding to a constant multiplied by the ratio of the amplitude of the larger of the third and the fourth signal to the amplitude of the smaller of the third and the fourth signal.

The invention is based on the insight that during reproduction, the playback head comprising the two electromagnetic transducers may not be positioned correctly relative to the tracks, viewed in a direction perpendicular to the tracks and in the plane of the magnetic record carrier. Such errors are sometimes referred to as tracking errors. This means that the two electromagnetic transducers, one for each of the two tracks, are both disposed partly on and partly off their corresponding tracks and consequently supply an output signal having a smaller amplitude then in the case of correct tracking.

If during recording and reproduction use is made of a compression and expansion system, as known from the literature, the lower levels of the transducer output signals result in an incorrect degree of expansion, which degree of expansion depends on the absolute value of the level of the transducer output signals. The incorrect expansion then gives rise to substantial distortion in the signal being reproduced.

By recording an auxiliary signal having a frequency content in a frequency range beyond the information frequency-range in the two tracks and in the magnetic record-carrier area between the tracks, the auxiliary signal is still reproduced with the correct amplitude in spite of tracking errors during reproduction by one of the two transducers, namely that transducer which is partly on its associated track and partly on the magnet record-carrier area between the tracks. The other transducer reproduces the auxiliary signal with a reduced amplitude. The ratio between these two amplitudes exactly represents the ratio of the amplitude of the information scanned without tracking errors to the amplitude of the information scanned in the case of tracking errors. In the case of tracking errors, by multiplying the amplitude of the information signal by that ratio, which may be a constant which is preferably unity, amplitudes are obtained which correspond to the amplitude of the information signal read in the absence of tracking errors. During subsequent expansion the information signals will therefore be expanded correctly, without the occurrence of additional distortion. In this way a recording and reproducing system is obtained which is independent of, and which consequently has a reproduction gain which is also independent of, such tracking errors.

The apparatus of the invention for recording information in two parallel tracks of a magnetic record carrier comprises an electromagnetic transducer for each of the tracks and is characterized in that the apparatus further comprises an electromagnetic transducer for recording the auxiliary signal in the tracks and in the magnetic record-carrier area between the tracks. For recording the auxiliary signal an additional recording head is needed. The width of the head gap of this transducer is then equal to twice the width of the head gap of each of the transducers of the stereo recording head plus the distance between the two tracks.

An apparatus of the invention for reproducing information in two parallel tracks of a magnetic record carrier, which apparatus comprises an electromagnetic transducer for each of the tracks, is characterized in that it further comprises an amplifier circuit having a first and a second input terminal, for applying an output signal of the two transducers to the amplifier circuit, and a first and a second output terminal on which a first and a second output signal are available. Connections are arranged between the first or the second input terminal respectively and the first or the second output terminal respectively of the amplifier circuit. In the connection between the first input terminal and the first output terminal there is arranged a series arrangement of a first filter unit belonging to the filter device and a first controllable amplifier. In the connection between the second input terminal and the second output terminal there is also arranged a series arrangement of a second filter belonging to the filter device and a second controllable amplifier. The first and the second filter units have a band-pass characteristic according to the information frequency-range. The amplifier circuit further comprises means for obtaining a control signal which can be applied to a control input of the two controllable amplifiers, which have the same gain characteristics as a function of the control signal.

The apparatus for both recording and reproducing information consequently comprises either at least three transducers, namely one transducer for recording the auxiliary signal and two transducers in one (stereo) head for both recording and reproducing the information, or at least five transducers, namely one transducer for recording the auxiliary signal, two transducers in one (stereo) head for recording the information and two transducers in another (stereo) head for reproducing the information.

An embodiment of the apparatus for reproducing information in two parallel tracks of a magnetic record carrier is characterized in that the apparatus further comprises a third and fourth filter unit belonging to the filter device, which units have band-pass characteristics corresponding to the frequency range of the auxiliary signal, in that a point in the connection between the first input terminal and an input of the first filter unit is connected to a first input of said means via the third filter unit, in that a point in the connection between the second input terminal and an input of the second filter unit is connected to a second input of said means via the fourth filter unit, and in that an output of said means, for supplying the control signal, is connected to the control inputs of the two amplifiers.

A preferred embodiment of the last-mentioned apparatus is characterized in that the means for obtaining the control signal comprise a first and a second rectifier circuit for rectifying a signal, and a comparator circuit, for comparing the signals applied to its two inputs with each other and for supplying a control signal to the two controllable amplifiers, in that the first and the second input of said means are respectively connected to a first and a second input of the comparator circuit via the first and the second rectifier circuit respectively, the output of said comparator circuit being connected to the output of said means, and in that the comparator circuit supplies a control signal such that the gain factors of the controllable amplifier are set to values corresponding to a constant multiplied by the ratio of the amplitude of the larger of the two signals applied to its inputs to that of the smaller of the two signals applied to its inputs.

The rectifier circuit may be half-wave or full-wave rectifiers. Preferably, full-wave rectifiers are employed. The advantage of this is that, especially in the case of an auxiliary signal with frequencies above 20 kHz the means for obtaining the control signal become less susceptible to phase shifts in the two signals as applied to said means. Said phase shifts arise, for example, in that the reproducing head is not in the correct angular position relative to the track (the so-called azimuth error).

After the rectifiers the signals will also be smoothed, so that the influence of phase shifts on the control system is further reduced.

A magnetic record carrier for use in an apparatus in accordance with the invention, for reproducing information, is characterized in that an auxiliary signal is recorded on the record carrier in the tracks and in the record carrier area between the tracks.

Figure 1B:
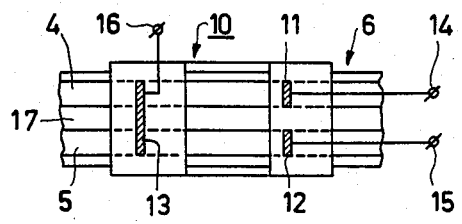
Figure 2:
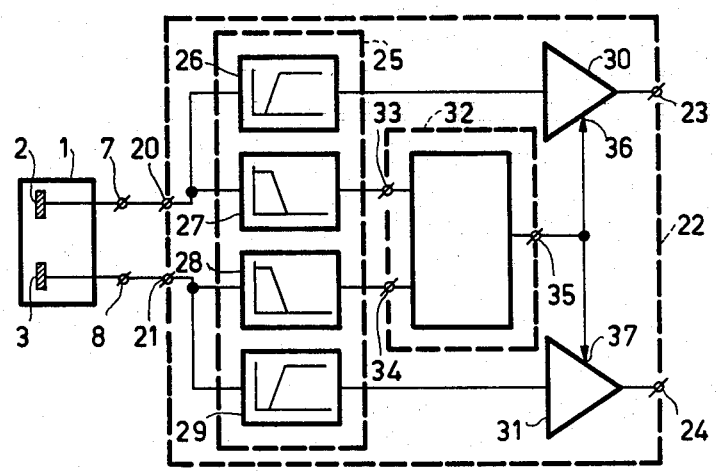
Figure 3:
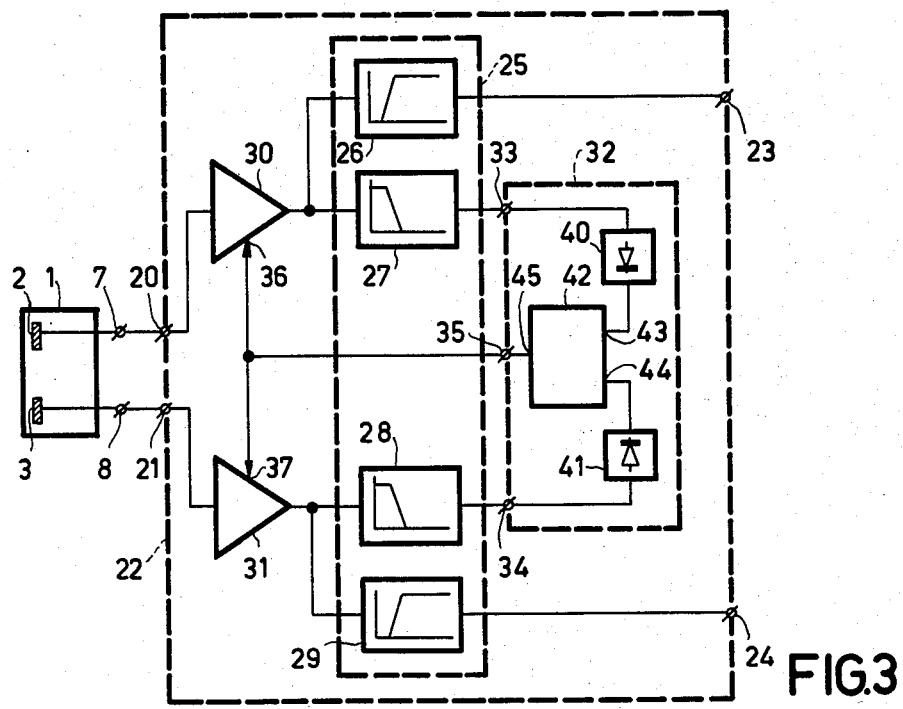
Figure 4:
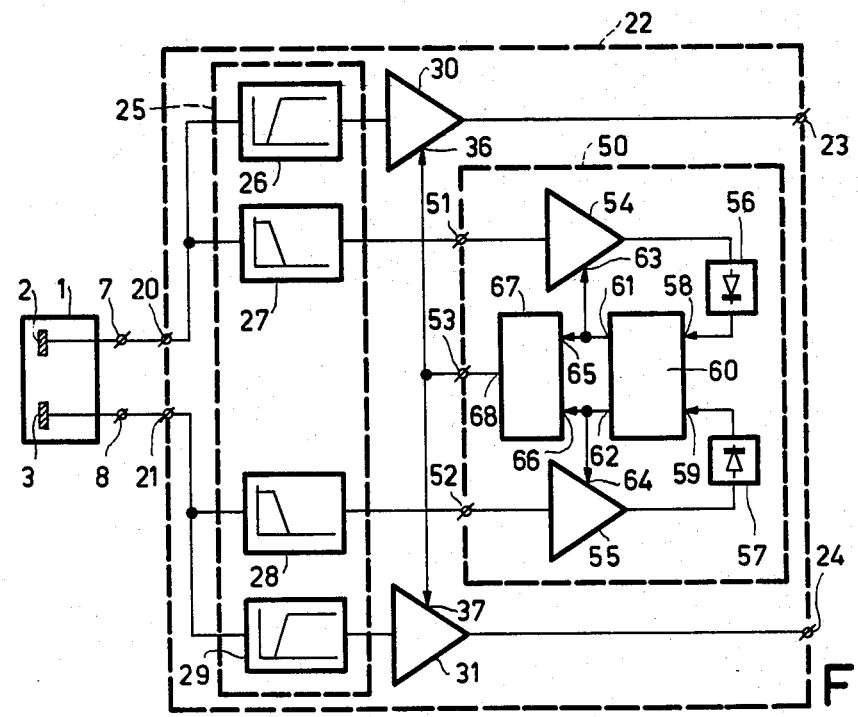

Some embodiments of the invention will now be described in more detail, by way of example, with reference to the drawing wherein:

FIG. 1a represents a reproducing head and FIG. 1b a recording head adapted for use in an apparatus for respectively reproducing or recording information in two parallel tracks of a magnetic record carrier, FIG. 2 shows an embodiment, FIG. 3 a further embodiment and FIG. 4 yet another embodiment of an apparatus in accordance with the invention for reproducing information in two parallel tracks of a magnetic record carrier.

FIG. 1a shows a reproducing head 1 comprising two electromagnetic transducers 2 and 3 for reproducing stereophonic information which has been recorded in two parallel tracks 4 and 5 of a magnetic record carrier 6.

As can be seen in FIG. 1a, the reproducing head 1 exhibits tracking errors, that is, the reproducing head 1 (and thus the transducers 2 and 3) is not correctly positioned relative to the tracks 4 and 5. During reproduction this results in the amplitude of the information read from the two tracks, which information is available on the two output terminals 7 and 8, being smaller than would be the case if the reproducing head were positioned correctly relative to the tracks 4 and 5.

FIG. 1b shows a recording head 10 comprising three electromagnetic transducers 11, 12 and 13. The transducers 11 and 12 serve for recording information applied to the two input terminals 14 and 15, in the two tracks 4 and 5 of the magnetic record carrier 6. Instead of two separate transducers 11 and 12 it is also possible to employ the transducers 2 and 3 both for reproduction and recording. The transducer 13 serves for recording an auxiliary signal, applied to the input terminal 16, in the tracks 4 and 5 and in area 17 between the tracks 4 and 5. The width of the transducer 13 (that is, the width of the head gap of the transducer 13) is equal to twice the width of the transducer 11 or 12 (the width of the head gap of the transducer 11 or 12) plus the distance between the tracks 4 and 5 (that is, the width of the area 17).

The auxiliary signal has a frequency content in a frequency range outside the frequency range of the stereophonic information.

FIG. 2 shows an embodiment of an apparatus in accordance with the invention for reproducing the information in two parallel tracks of a magnetic record carrier. The output terminals 7 and 8 of the reproducing head 1 are connected to two input terminals 20 and 21 of an amplifier circuit. The stereophonic output signal is available on the output terminals 23 and 24. A first filter unit 26 (belonging to a filter device 25) and a first controllable amplifier 30 are connected in series between the first input terminal 20 and the first output terminal 23. The sequence in which the filter unit 26 and the controllable amplifier 30 are arranged is irrelevant and may, alternatively, be the reverse of that shown in FIG. 2.

A second filter unit 29 (belonging to the filter device 25) and a second controllable amplifier 31 are connected in series between the second input terminal 21 and the second output terminal 24. Again the sequence of the two elements is irrelevant. The first and the second filter units 26 and 29 have a band-pass characteristic which corresponds to the frequency range of the stereophonic information, that is from approximately 50 Hz to approximately 20 kHz.

The apparatus further comprises a third and a fourth filter unit 27 and 28 belonging to the filter device 25. Units 27 and 28 a band-pass characteristic corresponding to the frequency spectrum of the auxiliary signal, which frequency spectrum is situated outside the frequency spectrum of the stereophonic information. Thus, for the auxiliary signal it is possible to employ a low-frequency, for example sinusoidal, signal having a frequency below 50 Hz. The frequency characteristic of the third and the fourth filter unit is then a low-pass characteristic having a cut-off frequency near 50 Hz. It is alternatively possible to employ a high-frequency signal of a frequency above 20 kHz as an auxiliary signal. In that case, the frequency characteristic of the third and the fourth filter unit is a high-pass characteristic having a cut-off frequency near 20 kHz.

Via the third filter unit 27 a point in the connection between the first input terminal 20 and the input of the first filter unit 26, in the present case the input terminal 20 itself, is connected to a first input 33 of the block 32 surrounded by broken lines. The block represents the means for obtaining a control signal.

A point in the connection between the second input terminal 21 and the input of the second filter unit 29, in the present case the input terminal 21 itself, is connected to a second input 34 of the block 32 via the fourth filter unit 28. The block 32 serves for obtaining a control signal derived from the input signals on its inputs 33 and 34. The resulting control signal is available on the output 35 of said block, which output is connected to the control inputs 36 and 37 of the first and the second controllable amplifier 30 and 31, respectively. The two controllable amplifiers have identical control characteristics as a function of the control signal.

The operation of the apparatus is as follows. The auxiliary signal components and the stereophonic information components are separated from the signals scanned by the reproducing head 1 by the filter device 25. The two auxiliary signals are used as the two input signals to the two inputs 33 and 34 of the means 32 for obtaining the control signal. The stereophonic information signals from which the auxiliary signal has been removed is applied to the two output terminals 23 and 24 via the controllable amplifiers 30 and 31.

Control is now effected as follows. During reproduction the left-hand and the right-hand signal component of the stereo information, which components have amplitudes $\alpha L$ and $\alpha R$ respectively, are available on the outputs of the first and the second filter unit 26 and 29, $\alpha$ being smaller than or equal to unity and indicating whether attenuation occurs as a result of an incorrect position of the reproducing head relative to the tracks. It is obvious that the attenuation is the same for both signal components. Furthermore, auxiliary signals having amplitudes $X_1$ and $X_2$ respectively appear on the output of the third and the fourth filter unit 27 and 28 respectively.

Assume that the reproducing head 1 is positioned exactly on the tracks. In that case the stereo information is not attenuated, that is $\alpha = 1$, so that on the outputs of the filter units 26 and 29 the stereo information is available with amplitudes L and R respectively. The amplitudes of the auxiliary signals reproduced by the two transducers 2 and 3 are then also equal, so that $X_1 = X_2$. The control signal is now such that controllable amplifiers have a gain factor A, A then being equal to a constant, preferably unity. This results in stereophonic information having amplitudes L and R on the output terminals 23 and 24.

Now assume that the situation represented in FIG. 1a occurs wherein the reproducing head is partly off the tracks. The two transducers 2 and 3 are both situated off their respective tracks 4 and 5 to the same extent. This gives rise to an attenuated stereo signal having amplitudes $\alpha L$ and $\alpha R$ on the outputs of the filter units 26 and 29. The magnitude of $\alpha$, and consequently the degree of attenuation, obviously depends on how far the transducers 2 and 3 have departed from the correct positions relative to the associated tracks 4 and 5 respectively. When the tracking error increases the degree of attenuation also increases, that is $\alpha$ is smaller.

The two amplitudes $X_1$ and $X_2$ of the auxiliary signals read by means of the transducers 2 and 3 respectively are now as follows. The transducer 3 is partly on the track 4 and partly on the record-carrier area 17 which also contains the auxiliary signal. The amplitude $X_2$ is therefore equal to what the amplitude $X_2$ is in the situation in which the reproducing head 1 is disposed exactly on the tracks. The transducer 2 has partly moved off the track. Consequently, the amplitude $X_1$ of the auxiliary signal on the output of the filter unit 27 has decreased, so that $X_1 < X_2$. The amplitude $X_1$ is decreased or attenuated by the same amount as the attenuation of the stereophonic signals so that $X_1 = \alpha X_2$.

Control is now effected in such a way that in the two controllable amplifiers the output signals on the outputs of the filter units 26 and 29 having amplitudes $\alpha L$ and $\alpha R$ are multiplied by a factor corresponding to a constant (suitably unity) multiplied by the ratio of the amplitude of the larger of the two output signals on the outputs of the third and the fourth filter unit 27 and 28 to the amplitude of the smaller of said output signals. Thus in the present case $A = (X_2/X_1)$.

Since $X_1 = \alpha X_2$, it follows that the gain factors of the two amplifiers 30 and 31 are equal to $1/\alpha$, so that again amplitudes L and R are obtained on the output terminals 23 and 24.

This demonstrates that the amplitude of the stereophonic signal on the output terminals 23 and 24 has become independent of tracking errors of the reproducing head 1.

For the reverse situation, in which the transducer 2 is partly on the track 4 and partly on the record carrier area 17, a similar explanation may be given, which then leads to $X_1 > X_2$, $A = (X_1/X_2)$ and $X_2 = \alpha X_2$, so that also in this situation the amplitudes of the signals on the output terminals 23 and 24 are equal to L and R.

Finally, the following is to be noted as regards the value of said constant. Said constant should of course have a value such that the expansion applied after the reproducing section in order to enlarge the dynamic range of the stereophonic information is effected correctly. The degree of expansion is related to the value of the amplitude of the stereophonic information.

By means of the controllable amplifiers (that is inter alia through the magnitude of said constant) the correct amplitude of the stereophonic information can be adjusted accurately.

Generally, it suffices if the constant has the value unity. This has the additional advantage of a minimal contribution to distortion in the stereophonic information by the apparatus in accordance with the invention.

FIG. 3 shows a further embodiment of the apparatus for reproducing information in two parallel tracks of a magnetic record carrier. This embodiment is similar to that shown in FIG. 2. Elements of FIGS. 2 and 3 bearing the same reference numerals are identical. The two controllable amplifiers 30 and 31 are not arranged behind the filter device 25 as in FIG. 2, but instead they precede said device, although this is not essential. Furthermore, the means 32 for obtaining the control signal comprise a first and a second rectifier circuit 40 and 41 and a comparator circuit 42. The first and the second input 33 and 34 respectively are connected to a first and a second input 43 and 44 respectively of the comparator circuit 42 via the first and second rectifier circuit respectively. The output 45 is connected to the output 35 of block 32. The rectifier circuits 40 and 41 serve for rectifying the signals applied to the inputs 33 and 34. These circuits may be half-wave or full-wave rectifiers. Suitably, full-wave rectifiers are used because in that case, for an auxiliary signal of frequencies higher than 20 kHz, the means for obtaining the control signal are less susceptible to phase differences in the two signals applied to the two inputs 33 and 34.

Said phase differences may, for example, arise when the angular position of the playback head relative to the tracks is not correct (azimuth errors). Furthermore, the output signals of the rectifier circuits will be smoothed so as to further reduce the influence of phase differences.

The comparator circuit 42 serves for comparing the signals applied to its two inputs 43 and 44 with each other and for supplying the control signals to the two control amplifiers. Controlling is effected in a manner identical to that of the embodiment shown in FIG. 2.

FIG. 4 shows a further embodiment, which again bears much resemblance to that of FIG. 2. The means for obtaining the control signal are now represented by the block 50.

The outputs of the third and the fourth filter unit 27 and 28 respectively are again connected to the first and second input 51 and 52 respectively of the means 50. The output 53 is again connected to the control inputs 36 and 37 of the two controllable amplifiers 30 and 31.

Via a third controllable amplifier 54 and a first rectifier circuit 56, the input 51 is connected to a first input 58 of a comparator circuit 60. Via a fourth controllable amplifier 55 and a second rectifier circuit 57, the input 52 is connected to a second input 59 of the comparator circuit 60. A first output 61 of the comparator circuit 60 is connected to both the control input 63 of the controllable amplifier 54 and to a first input 65 of a maximum-value detector 67. The second output 62 of the comparator circuit 60 is connected to both the control input 64 of the controllable amplifier 55 and to the second input 66 of the maximum-value detector 67. The output 68 of said detector is connected to the output 53 of the means 50. The operation and circuit arrangement of the rectifier circuits 56 and 57 is identical to the operation and circuit arrangement of the rectifier circuits 40 and 41 in FIG. 3.

The comparator circuit 60 serves for comparing the signals applied to its two inputs 58 and 59 with each other and for producing two control signals on its two output signals 61 and 62, which control signals are applied to the control inputs 63 and 64 of the third and the fourth controllable amplifier 54 and 55.

In the means 50 control is effected in such a way that upon application of two signals to the inputs 51 and 52 the gain factor of that controllable amplifier (54 or 55) which receives the signal having the larger amplitude is set to the value unity, while the gain factor of the other controllable amplifier (55 or 54) is set to a gain factor equal to the ratio of the amplitude of the larger of the two signals applied to the inputs 51 and 52 to that of the smaller of the two.

In the example described in the foregoing, in which the reproducing head, as is shown in FIG. 1b, is disposed off the track, the amplifier 55 is set to a gain factor equal to unity, whilst the amplifier 54 is set to a factor equal to $(X_2/X_1)$.

In the maximum-value detector the control signals, applied to the two controllable amplifiers 54 and 55, are compared with each other and the larger of the two is transferred as a control signal for the controllable amplifiers 30 and 31, so that said amplifiers are also set to a gain factor equal to $(X_2/X_1)$.

It will be appreciated that the invention is not limited to the embodiments shown in the Figures. It is obvious that the invention also applies to those embodiments which differ from the embodiments described with respect to points which do not relate to the invention.

What is claimed is:

1. A method of reproducing information recorded in two spaced apart, parallel tracks on a magnetic record carrier on which an auxiliary signal is recorded in each of the tracks and in the area between the tracks, said auxiliary signal having a frequency content outside the frequency range of the information recorded in said tracks, said method comprising the steps of reading each of the tracks with a respective one of a pair of transducers, said transducers each supplying a readout signal having an information component representative of the information and an auxiliary signal component representative of the auxiliary signal read by the respective transducer, separating said information and auxiliary signal components from each of said readout signals so as to obtain a pair of information signals each corresponding to the information read by the respective transducer and a pair of further signals each corresponding to the auxiliary signal read by the respective transducer, and multiplying the amplitude of each of said information signals by a factor corresponding to a constant multiplied by the ratio of the amplitude of the larger of said two further signals to the amplitude of the lower of said two further signals so as to compensate for variations of said information components due to tracking errors.

2. The method according to claim 1 wherein said information and auxiliary signal components are separated from said readout signals by applying each of said readout signals to a filter device.

3. The method according to claim 1 or 2 wherein said constant is equal to unity.

4. An apparatus for recording and reproducing information from a magnetic record carrier, said apparatus comprising means for recording information in two parallel, spaced apart tracks on the magnetic record carrier, means for recording an auxiliary signal in each of the tracks and in the area between the tracks, said auxiliary signal having a frequency content outside the frequency range of the information recorded in said tracks, a pair of transducers each arranged to read a respective one of said tracks, said transducers each supplying a readout signal having a first component representative of the information and a second component representative of the auxiliary signal read by the respective transducer, means for separating said first and second components from each of said readout signals so as to obtain a pair of information signals each corresponding to the information read by the respective transducer and a pair of further signals each corresponding to the auxiliary signal read by the respective transducer, and means for multiplying each of said information signals by a factor corresponding to a constant multiplied by the ratio of the amplitude of the larger of said pair of further signals to amplitude of the smaller of said pair of further signals so as to compensate for tracking errors.

5. An apparatus for reproducing information recorded in two spaced apart, parallel tracks on a magnetic record carrier on which an auxiliary signal is recorded in each of the tracks and in the area between the tracks, said auxiliary signal having a frequency content outside the frequency range of the information recorded in said tracks, said apparatus comprising a pair of transducers each arranged to read a respective one of said tracks and each supplying a readout signal having a first component representative of the information and a second component representative of the auxiliary signal read by the respective transducer, means for deriving from each of said readout signals a first signal representative of information and a second signal representative of the auxiliary signal read out by the respective transducer, and means for multiplying the amplitude of each of said first signals by a factor corresponding to a constant multiplied by the ratio of the amplitude of the larger of said second signals to the amplitude of the smaller of said second signals so as to compensate for tracking errors.

6. The apparatus according to claim 5 wherein said deriving means includes first filter means having band-pass characteristics corresponding to the frequency of the information for separating said first signals from said readout signals and second filter means having band-pass characteristics corresponding to the frequency of the auxiliary signal for separating said second signals from said readout signal.

7. The apparatus according to claim 5 or 6 wherein said multiplying means includes variable gain amplifier means for amplifying each of said readout signals and means for controlling the gain of said amplifier means such that the amplitude of each of said readout signals is amplified by a factor corresponding to said constant multiplied by said ratio.

8. The apparatus according to claim 5 or 6 wherein said multiplying means includes variable gain amplifier means for amplifying each of said first signals and means for controlling the gain of said amplifier means such that the amplitude of each of said first signals is amplified by a factor corresponding to said constant multiplied by said ratio.

9. An apparatus for reproducing information in two parallel tracks on a magnetic record carrier on which an auxiliary signal is recorded in the tracks and in the magnetic record carrier area between the tracks, said auxiliary signal having a frequency content situated outside the frequency range of the information, said apparatus comprising two electromagnetic transducers each arranged to read one of the two tracks and an amplifier circuit having a first and second input terminal each receiving a readout signal of a respective one of said two transducers and a first and second output terminal for supplying a first and second output signal, said amplifier circuit further comprising:

a first filter unit and a first controllable amplifier connected in series between said first input terminal and said first output terminal, and a second filter unit and a second controllable amplifier connected in series between said second input terminal and said second output terminal, said first and second filter units having band-pass characteristics corresponding to the information frequency range so as to separate the information components from each of said readout signals to thereby yield a first and second signal corresponding to the information read from the record carrier, a third and fourth filter unit each connected to respective one of said first and second input terminals and each having a band-pass characteristic corresponding to the frequency of the auxiliary signal so as to separate the auxiliary signal component from each of said readout signals to thereby yield a third and fourth signal corresponding to the auxiliary signal read from the second carrier, and means for generating a control signal, said generating means having a first input connected via said third filter unit to said first input terminal, a second input connected via said fourth filter unit to said second input terminal, and an output for supplying said control signal, which control signal is applied to said controllable amplifiers so as to vary the gain characteristics thereof such that said first and second signals are both multiplied by a factor corresponding to a constant multiplied by the ratio of the amplitude of the larger of said third and fourth signals to the amplitude of the smaller of said third and fourth signals to thereby yield said first and second output signals.

10. An apparatus as claimed in claim 9 wherein the means for generating the control signal comprises a first and a second rectifier circuit and a comparator circuit having two inputs and an output, the first and the second input of said generating means each being connected to a respective one of the two inputs of the comparator circuit via one of the first and the second rectifier circuits, the output of said comparator circuit being connected to the output of said generating means, the comparator circuit supplying a control signal at the output thereof such that the gain factors of the controllable amplifiers are set to values corresponding to a constant multiplied by the ratio of the amplitude of the larger of the two signals applied to its inputs to that of the smaller of the two signals applied to its inputs.

11. An apparatus as claimed in claim 9 wherein the means for generating the control signal comprises a first and a second rectifier circuit for rectifying a signal applied thereto, a comparator circuit for comparing signals applied to its two inputs with each other and for producing two control signals on its two outputs, a third and a fourth controllable amplifier, and a maximum-value detector for determining the larger of the two signals applied to its two inputs and for transferring said larger signal to its output, each of the first and second inputs of said generating means being connected to a respective one of the inputs of the comparator circuit via one of the third and fourth controllable amplifiers and one of the first and second rectifier circuits, each output of the comparator circuit being connected to both a control input of one of the third or fourth controllable amplifiers and to one input of the maximum-value detector, the output of the maximum-value detector being connected to control inputs of the first and the second controllable amplifier, and wherein the comparator circuit supplies control signals such that the gain factors of the third and the fourth controllable amplifier respectively are set to a value corresponding to a constant for that controllable amplifier which receives the larger of the two signals applied to the two inputs of said generating means or corresponding to a constant multiplied by the ratio of the amplitude of the larger of the two signals applied to said inputs of said generating means to that of the smaller of the two signals applied to said inputs.

12. An apparatus as claimed in claim 10 or 11, characterized in that the rectifier circuits are full-wave rectifiers.

* * * * *